Patented Dec. 18, 1923.

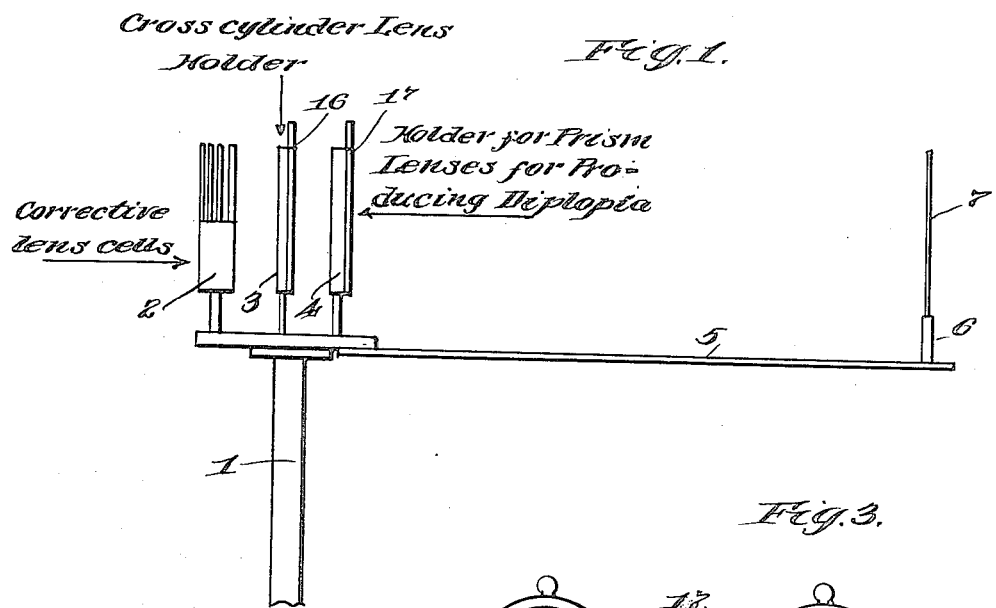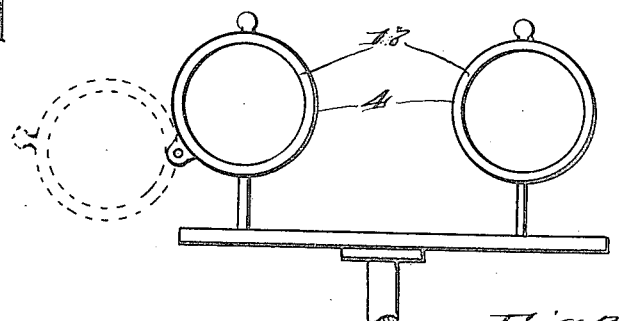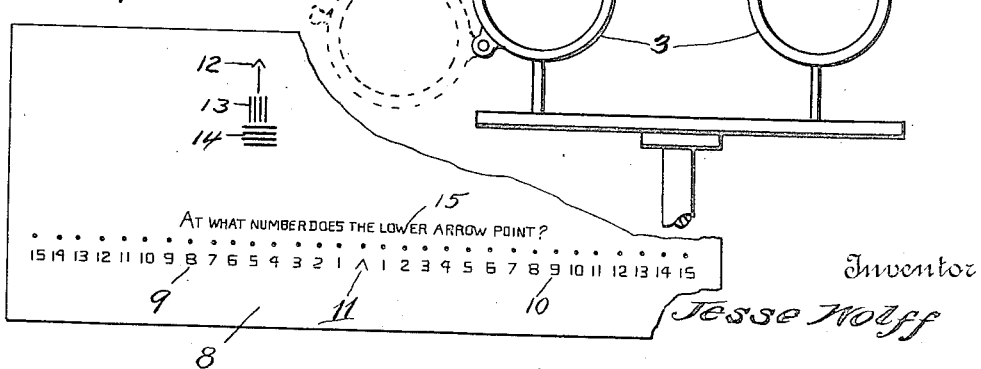

1,478,089

UNITED STATES PATENT OFFICE.

JESSE WOLFF, OF SPOKANE, WASHINGTON.

METHOD OF TESTING EYES.

Application filed December 18, 1922. Serial No. 607,685.

*To all whom it may concern:*

Be it known that I, JESSE WOLFF, a citizen of the United States, residing at Spokane, in the county of Spokane and State of Washington, have invented new and useful Improvements in Methods of Testing Eyes, of which the following is a specification.

This invention relates to an improved method of testing the eyes and has to do primarily with conditions of accommodation and convergence, as regards eyes naturally or previously rendered emmetropic. This improved test has to do exclusively with what is generally known as a reading test and which is made at one-third of a meter.

One of the features of this invention consists, as regards the test for accommodation, in subjecting the eyes to an abnormal condition, preferably an artificial astigmatic condition, and while the eyes are thus subjected, I first test one eye, then the other eye, and then both eyes, for the proper lens power to render accommodation efficient, or in other words, to determine just how much lens power to add in order that the cilliary muscles may be relieved from strain in attempting to do more work than they are capable of doing.

When the eyes have been separately tested to determine lack of accommodation, but in the absence of the binocular test, the findings for the separate eye tests are almost wholly lacking in co-ordination, and hence the exact degree of efficiency of accommodation, to a minute degree, cannot thus be obtained. With my improved method of following the individual eye test, by a binocular test, the findings from the individual tests can be modified in accordance with the result of the binocular test, so that the most minute degree of efficiency of accommodation of both eyes, can be obtained, providing the eyes are subjected to the aforesaid astigmatic condition which is a special feature of the novelty of this method.

A further feature consists in a novel method of testing the eyes to determine lack of balance of convergence, and this phase of my invention involves placing corrective or indicating indicia before the eyes and in subjecting the latter to an abnormal condition which is, specifically speaking and preferably, inseparable vertical diplopia, which renders said indicia active, in such a manner, as to indicate the extent of imbalance of the lateral occular muscles.

It is also a feature of novelty in my improved test to determine lack of balance, to simultaneously and alternately subject the eyes to normal and sustained reading stress while viewing the indicia, in the presence of diplopia, to thereby develop to the maximum or most pronounced degree, either excess or insufficiency of convergence.

It is well known to those skilled in this art, that the cilliary muscles that change the convexity of the lenses of the eyes, for accommodation purposes, and the internal recti muscles that control lateral movement of the eyes during convergence, receive their nervous energy from the third nerve. Hence, there is a most intimate, and even an interdependent relation between accommodation and convergence of the eyes.

Therefore, it is a special feature of my improved method to harmonize and co-ordinate the tests on accommodation and convergence so that the findings from one thereof, may be not only modified, if necessary to accord with the other, but more important, to make the test for convergence while the eyes are under the control of the corrective lens power for accommodation and under sustained reading load. Thus while I claim distinct and separate novelty in the test for accommodation and the test for convergence, I also claim novelty in the combination of the two because of the interrelation just described, and the new function resulting.

In addition to the novel methods, my invention resides in an optical test card, as an article of manufacture.

My invention will be more fully described in connection with the accompanying drawing, and will be more particularly pointed out in and by the appended claims.

In the drawings.—

Fig. 1, is a view in side elevation of a somewhat diagrammatically illustrated instrument for carrying out my improved process.

Fig. 2, is a face view of the cross cylinder lens holders.

Fig. 3, is a face view of the holders for the prism lenses.

Fig. 4, is a face view of my improved optical card.

Like characters of reference designate similar parts throughout the different figures of the drawing.

As shown, 1 designates an instrument on which is supported a plurality of holders 2, 3 and 4. The holder 2 is for corrective lenses, the holder 3 is for cross cylinder lenses and the holder 4, is for prism lenses for producing diplopia. The instrument has an extension 5, provided with a holder 6, in which my improved optical card 7, is supported.

First describing my improved card, designated at 8, the same is provided with indicia or indices which, in the preferred form, consists of a linear row of ordinals 9, consisting of numerals 1 to 15, which I will term "excess" indices, and a similar row 10, consisting of numerals 1 to 15, which I will term "insufficiency" indices, and an interposed arrow head or zero 11, which I will term a corrected index. In off-set relation with respect to the index 11 and above the ordinals 9, is an object 12, which is specifically in the form of a vertically disposed arrow having disposed subjacent thereto, a series of vertical lines 13, and a series of horizontal lines 14. The function of the lines 13 and 14, will be later developed, and the arrow 12, as the object, will now be described.

It will be noted that the arrow 12, is superposed directly above ordinal "5", of the "excess" indicia. The reason for this is that five prism diopters is the standard average allowance for the physiological exophoria present in normally functioning convergence. Thus, in the normal eye, when subjected to inseparable vertical diplopia, as will be later developed, the arrow 12, will drop just below ordinal "5", with the arrow head registering with the tops of the ordinals, and will move laterally to the right, into registry with the index 11, thus taking up the above named average allowance. By this means, it will be seen that at the start, I provide for taking up what might be termed "slack". For instance, no one would make a pair of scales, which without load, would register five pounds. Thus, by taking up this natural exophoria, I start, at zero. I claim this as novel.

Directly above the indicia 9 and 10, is a line of type of readable matter 15, preferably in close parallel relation thereto and forming a thought imparting sentence, as shown. This is novel and important, as will be later more specifically developed. A further feature is that the type is not so large that the average eye can read it without special effort, as its function is to impose a reading load, as it were, to obtain a working or normal accommodative action.

This invention is addressed and is essentially of utility, with eyes which are initially emmetropic, or have been made so by corrective lenses. Now assuming that a patient's eyes are to be tested in accordance with my invention, in view of such correction, the procedure initially for testing accommodation, will be as follows:

In the pair of holders 2, (one only being shown) are the lenses that have corrected distance vision. The pair of holders 3, each has a pivotally mounted cross cylinder lens frame 16, in which the cross cylinder lenses are mounted. First one frame 16, is swung into operative position, the second eye being covered, to test one eye, and then the companion frame 16, is swung into position to test the second eye, the first eye being covered, and then both frames are placed in an operative position for the binocular test. Thus, the eyes, while under control of the corrected distance lenses, are first singly, and then binocularly subjected to a condition of artificial astigmatism. Apart from artificial astigmatism, broadly speaking, it is an object and a feature of this invention to produce a special character of astigmatism, which I will term "mixed or double astigmatism", in which the vision of the patient is blurred so slightly as to be imperceptible to the patient, (in the absence of comparison,) in both the horizontal and vertical meridians, equally. The vertical and horizontal meridians of the cross cylinder lenses, correspond with the vertical and horizontal lines 13 and 14, of card 8, to which the patient is instructed to look. The holders 4 are not in operative position during this test.

This artificial astigmatic condition has nothing to do with myopic, astigmatic, or hyperopic conditions, but is primarily a dynamic test to instantly force accommodation to maximum exertion to determine, if there is either under functioning or over functioning of the cilliary muscles which are the muscles used in controlling convexity of the lenses of the eyes. By means of the cross cylinder lenses, I instantly stimulate accommodation to maximum exertion, which could not otherwise be accomplished except by causing the patient to read for about one-half an hour. I believe it new, to detect over accommodation, in this manner. In the event that there is under functioning, the horizontal lines appear the most distinct or clearer and blacker than the vertical lines. Then, I add plus spherical lens power in increasing amounts until both sets of lines are of equal clearness. This added lens power is inserted in holder 2, so that the eye will still be subject to the cross cylinder lens in holder 3. If there is over accommodation, then the vertical lines will appear more distinct than the horizontal, and I add minus spherical lens power until both sets of lines appear with equal clearness. Now, I have arrived at the proper corrective preliminary lens power to correct accommodation in one eye.

The above plus finding, is always accurate in cases of presbyopia or paresis of accommodation. However, in cases commonly termed as under the presbyopic age, and more especially, in those cases under thirty five years of age, I make an allowance of approximately one diopter plus, or reduce the findings one diopter. I have found that this is an accommodative lag, and not correctable, and should not be corrected, ordinarily.

I next test the other eye, in the same manner as the first, and I might find that the other eye is the same or different from the first tested eye, in which event I make the proper correction. I use the cross cylinder test on each eye separately to determine lack of accommodation of each eye separately, but I find that the findings of such a test do not always coincide when both eyes are tested by such a method. Hence, in addition to testing the eyes separately, I subsequently make a binocular test.

This binocular test is made in the same manner as the previous tests for each eye singly. I adjust both cross cylinder lenses into position, and both of the patient's eyes are now subjected to the astigmatic condition. It might be superficially assumed that if an accurate correction of accommodation had been made for each eye singly, that accommodation of both eyes, would necessarily, and inevitably be correct, but this, I have found is not always true. Because of the reflex action of binocular single vision, accommodation does not coordinate, in some cases, and in other cases it does, hence, the value of the binocular test in those cases where co-ordination does not result. This will be further elucidated in connection with this invention as applied to the convergence test.

As regards the character of cross cylinder lenses used, I obtain the best results with a plus fifty with axis at one hundred and eighty degrees combined with, minus fifty with axis at ninety degrees.

Assuming that the next step in the test, namely, convergence is to be made, I first shift both cross cylinder lens frames 16, out of operative position, and shift both lens frames 17, into operative position. As before stated, these frames 17, contain the prism lenses for producing inseparable vertical diplopia. The prisms used in this test are each of five prism diopters strength. The right eye prism is positioned with its base down and the left eye prism is positioned with its base up. This precise power of prism is essential with the optical card used, which as shown in Fig. 4, is full size and actual scale. It is desired to lower the object so that the point of the arrow 12, will register with the ordinals at the tops thereof, and with this scheme in view, the point 12, of the object arrow is three centimeters above the top of the ordinals, which represents a separation correctable by ten prism diopters. The spacing of the ordinals from each other is fixed with relation to the reading distance of the test which is one-third of a meter or thirteen and one-third inches, the spacing being three and one-third millimeters separation.

I produce an abnormal condition of the eyes for this convergence test, which is preferably inseparable vertical diplopia, not solely because I want a condition of diplopia, as such, but because diplopia will energize the indicia, or more specifically speaking, will cause the object arrow 12 to drop down below the ordinals and register therealong, the extent of excess or insufficiency, thereby facilitating correction. Another reason for producing diplopia is, that it makes fusion passive, thereby indicating the natural tendency. Because of the novel disposition of the arrow 12, laterally of the zero index 11, and above the excess ordinals to the left of the card to the extent of five degrees, which is allowance for physiological exophoria, then, if the patient's eyes have normal convergence, the arrow 12 will drop to the top of the ordinals and visually move to the right into exact registry with index 11. If the condition of convergence is that of excess or insufficiency, then, the arrow 12, instead of registering with index 11, will register with any of the ordinals in either series of indices in accordance with the condition present. At this stage, while the patient is looking at the numbers, neither accommodation or convergence is fully energized, as in sustained reading, for instance, and hence, my test of convergence, at this stage, is not fully complete. However, I have disclosed the same to the point where excess or insufficiency are indicated. For a complete development of the test, I will next enter into the interrelated bearing of accommodation and convergence.

Suppose the patient's eyes showed an excess of five prism diopters in merely viewing the ordinals, with accommodation and convergence not fully energized, then, according to my improved method, I would not stop and base a finding of convergence on this indication. In accordance with my invention, I ask the patient to repeatedly read the line of type, to view the ordinals, and again read the line of type. Before doing this, the arrow may move from five to four or six, thereby failing to make a definite indication. But after sustained reading of the type, the arrow, instead of wavering, becomes stationary, at the index, in some cases, and in other cases must be forced back by added lens power, thereby in either case definitely indicating to the patient and the examiner, a perfect balance. Now the reason why I ask the patient to read the line of type repeatedly, is to get fully energized accommodation, as it is a novel feature of my invention to obtain my convergence test in the presence of, or while the eyes are subjected to the fullest exercise of the accommodative faculty.

I wish now, to go back and point out wherein the cross cylinder test for accommodation, alone, while going a long way toward accurate correction of the accommodation, and hence is therefore a complete test entity, is not, however, such a test as would amount to a final correction. Likewise, the diplopia test for convergence, is sufficiently complete to amount to an entity, even if it falls short of the perfection of the most improved embodiment of my invention. Either of these tests, alone, and in the absence of co-ordination, would be far more accurate than many tests of different nature but for like purpose, now employed. However, with co-ordination of the two tests, I am able in the most minute degree to determine any change from the accommodation test that shows up subsequently in the test on convergence, and finally, in the combined test, I can alter any findings of either accommodation or convergence. Hence, I will term the combined test, the accommodative-convergence test.

Again, it will be stated that all that comprises this invention, in the form of tests, is effected or takes place after the eyes have previously been rendered emmetropic, however, a great advantage of my test is that certain defects that may, or may not show up in the test upon distance vision, will be developed in the tests heretofore set forth, so that at the end, a more accurate emmetropic and orthophoric correction may be made. Hence, the findings when scrutinized after making the reading test for accommodation and accommodative-convergence, may be open to change or improvement. Thus, my test, in addition to its high efficiency, for convergence and accommodation, is a proof test for all that precedes these accommodation and accommodative-convergence tests.

I do not wish to be limited hereto, except for such limitations as the claims may import.

I claim:

1. The herein-described method of testing the efficiency of accommodation to a minute degree of eyes naturally or previously rendered emmetropic, which consists in subjecting the eyes to an artificial astigmatic condition to stimulate accommodation, and in then testing for the proper lens power to relieve the cilliary muscles and render accommodation efficient.

2. The herein-described method of testing the efficiency of accommodation to a minute degree of eyes naturally or previously rendered emmetropic, consisting in subjecting first one eye, then the other eye, and then both eyes to an artificial astigmatic condition to stimulate accommodation and in separately testing each eye and then both eyes for the proper lens power to relieve the cilliary muscles and render accommodation efficient.

3. The herein-described method of testing the efficiency of accommodation to a minute degree of eyes naturally or previously rendered emmetropic, consisting, in subjecting the eyes to a mixed or blurred astigmatic condition wherein the patient's vision is very slightly blurred in both the horizontal and vertical meridians equally to stimulate accommodation and in then testing for the proper lens power to relieve the cilliary muscles and render accommodation efficient.

4. The herein-described method of testing the efficiency of accommodation to a minute degree of eyes naturally or previously rendered emmetropic, consisting, in subjecting each eye singly and then both eyes to cross cylinder lenses to create a slightly blurred vision equally in both the horizontal and vertical meridians to stimulate accommodation, in placing before the patient an object consisting of horizontal and vertical lines corresponding to the horizontal and vertical meridians of said lenses, and in then testing for the proper corrective lens to relieve the cilliary muscles and render accommodation efficient while the eyes are subject to the corrective lenses for distant vision.

5. The herein-dscribed dynamic method of testing the efficiency of accommodation to a minute degree in eyes naturally or previously rendered emmetropic, consisting, subjecting the eyes to cross cylinder lenses to instantly stimulate accommodation to maximum exertion, and in adding plus spherical lens power to correct under-accommodation, and in adding minus spherical lens power to correct over-accommodation.

6. The herein-described method of testing the eyes to determine lack of balance of convergence, consisting, in placing before the eyes corrective indicating indicia, and in producing an abnormal condition of the eyes to cause said indicia to visually indicate the extent of the imbalance of the lateral occular muscles.

7. The herein-described method of testing the eyes to determine lack of balance of convergence, consisting, in placing before the eyes corrective indicating indicia, and in producing inseparable vertical diplopia to render said indicia visually and correctively active to indicate the extent of imbalance of the lateral occular muscles.

8. The herein-described method of testing the eyes to determine lack of balance of convergence, consisting, in placing before the eyes a series of corrective indicating indices and an object, and in producing inseparable vertical diplopia to cause said object to visually register on the indices the extent of imbalance of the lateral ocular muscles.

9. The herein-described method of testing the eyes to determine lack of balance of convergence, consisting, in placing before the eyes an object and a plurality of series of corrective denoting indices for denoting either convergence excess or insufficiency, and in producing inseparable vertical diplopia to cause said object to visually register along one or the other series of indices the extent of excess or insufficiency of the lateral ocular muscles.

10. The herein-described method of testing the eyes to determine lack of balance of convergence, consisting, in placing before the eyes a series of fixed excess and a series of fixed insufficiency indicating indices extending in linear opposition from an interposed corrective or balance index and with an object in off-set relation with respect to said index, and in producing inseparable vertical diplopia to cause said object to visually register along one or the other series of indices to indicate excess or insufficiency, and then applying lens or prism power or both to cause said object to visually move into registry with said corrective index to indicate that proper lens or prism relief has been supplied to the lateral ocular muscles.

11. The herein-described method of testing the extent of efficiency of accommodation and the imbalance of convergence, which consists, in subjecting the eyes to an artificial astigmatic condition to instantly stimulate accommodation to maximum exertion, in then testing for the corrective lenses to render accommodation minutely efficient as regards both under and over accommodation, in then removing the astigmatic condition, in placing before the eyes a series of corrective indicating indices and an object, and in producing inseparable vertical diplopia to cause said object to visually register on the indices the extent of imbalance of the lateral ocular muscles while the eyes are under control of the corrected accommodative lenses, whereby convergence correction is made while the eyes are under control of the corrected lens power for accommodation.

12. The herein-described method of testing the eyes to determine lack of balance of convergence and while accommodation is stimulated, which consists, in placing before the eyes corrective indicating indicia, in producing inseparable vertical diplopia to render said indicia visually active to denote the necessary correction, in subjecting the eyes to normal reading stress alone and simultaneously with or by viewing the indicia and also alternately to thereby develop maximum excess or insufficiency while accommodation is stimulated.

In testimony that I claim the foregoing as my own, I hereby affix my signature.

JESSE WOLFF.